No. 671,249. Patented Apr. 2, 1901.
E. THOMSON.
RECTIFIER.
(Application filed Jan. 9, 1900.)
(No Model.) 2 Sheets—Sheet 1.

Witnesses.
Lewis P. Abell.
A. F. Macdonald.

Inventor.
Elihu Thomson
by Albert G. Davis
Atty.

No. 671,249. Patented Apr. 2, 1901.
E. THOMSON.
RECTIFIER.
(Application filed Jan. 9, 1900.)
(No Model.) 2 Sheets—Sheet 2.

Witnesses.
Lewis P. Abell.
A. F. Macdonald.

Inventor:
Elihu Thomson
by Albert G. Davis
Atty.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

RECTIFIER.

SPECIFICATION forming part of Letters Patent No. 671,249, dated April 2, 1901.

Application filed January 9, 1900. Serial No. 873. (No model.)

*To all whom it may concern:*

Be it known that I, ELIHU THOMSON, a citizen of the United States, residing at Swampscott, in the county of Essex and State of Massachusetts, have invented certain new and useful Improvements in Rectifiers, (Case No. 1,087,) of which the following is a specification.

Among the difficulties to be overcome in rectifying alternating currents is the sparking which takes place at the moment of commutation. In order to reduce the sparking to a minimum, it is necessary that the commutation take place at some particular point in the wave of the alternating current, this point being generally at or near the zero value. If the commutation takes place at other values of current, an increase in sparking is the result. Owing to this fact a change of load on the rectified circuit generally causes an increase in sparking, since it shifts the phase of the current, and therefore changes the point in the wave at which commutation takes place. To overcome this difficulty, it has been a common practice to adjust the brushes of the rectifier either by hand or by automatically-controlled means. In either case the brush adjustment is a troublesome matter, and to avoid the necessity for moving the brushes I have provided an apparatus in which the brushes are maintained in a fixed position and the necessary adjustment of the point of commutation secured by varying the angular position of the commutator driving-shaft with respect to the alternating wave of impressed electromotive force.

My invention further comprises means for avoiding the bad effects due to "hunting" of a synchronous driving-motor for a rectifier.

My invention may assume many different forms as to its broad features, and for purposes of illustration I have therefore selected embodiments of the same which I consider useful in practice; but it is to be understood that in describing certain modifications which my invention may undergo I do not thereby intend to limit myself to the particular forms or details shown, but, on the contrary, the scope of my invention is to be determined by reference to the claims appended hereto and not solely by an examination of the following description and accompanying drawings, showing specific embodiments thereof.

Figure 1:
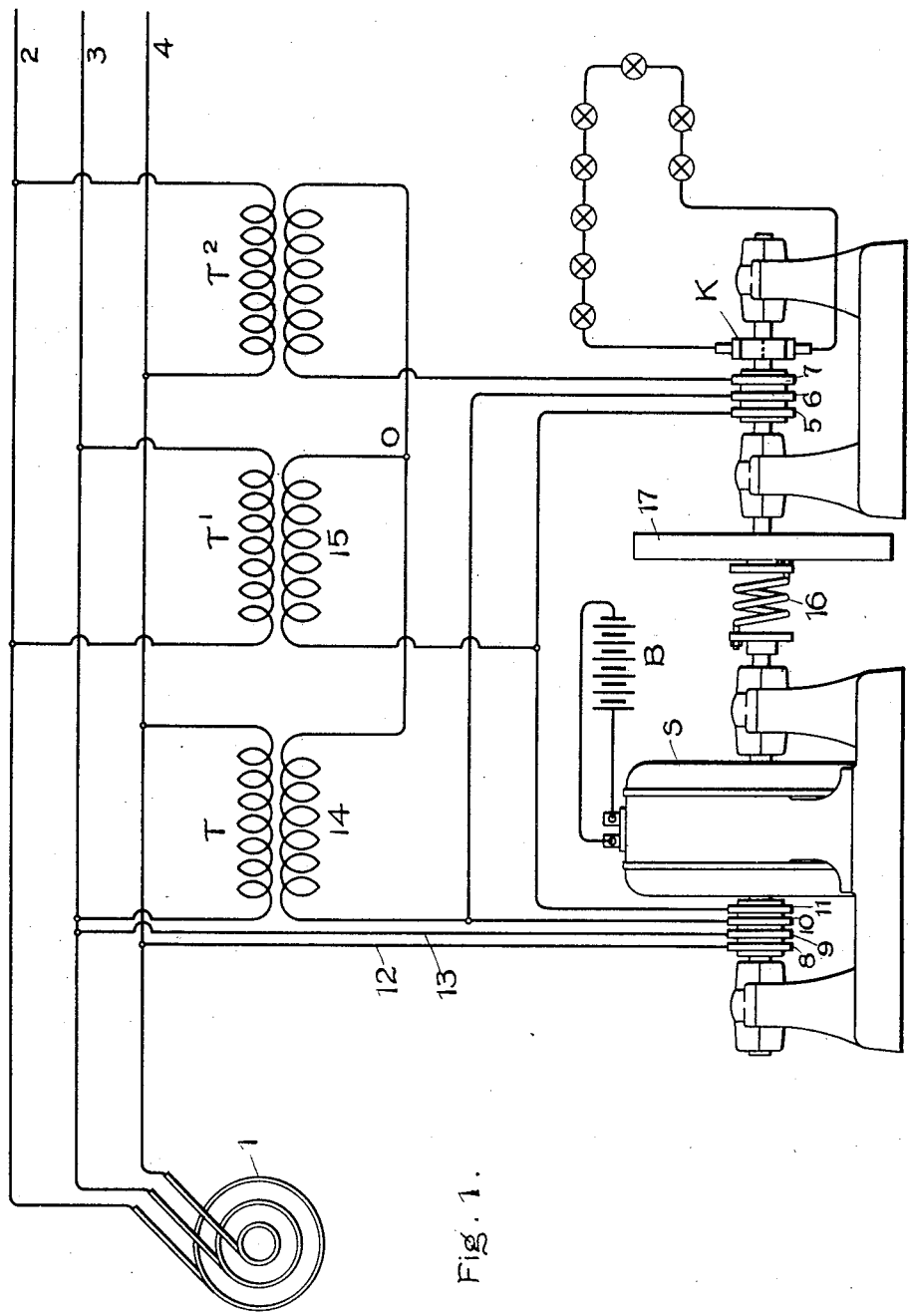
Figure 2:
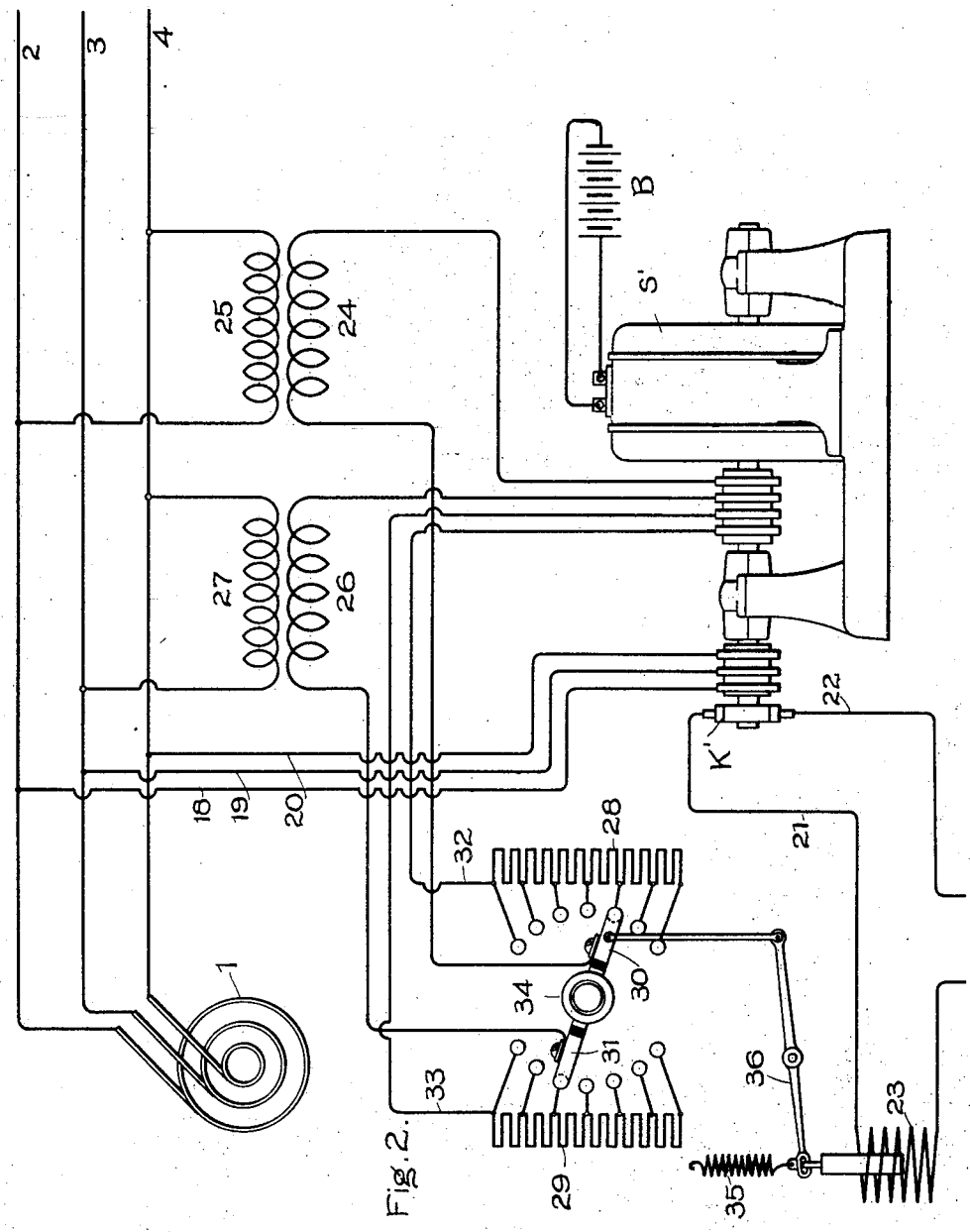

In the drawings, Figures 1 and 2 show modifications of a rectifying apparatus.

In Fig. 1 a source of alternating current of the three-phase type is indicated diagrammatically at 1, this source being connected to distributing-mains 2 3 4 for supplying current to translating devices of any desired nature. The drawings show a rectifying apparatus connected to the supply-mains 2, 3, and 4; but it will be understood that other translating apparatus as well may derive current from the same source. The rectifying apparatus consists of a rectifying-commutator supplied from the secondary windings of a system of transformers T T' T². These transformers are of the three-phase type and are connected with their primary windings to the supply-mains 2 3 4, the secondary windings being shown in this instance as Y-connected—that is, with one terminal of each winding joined to a common point, (indicated at O.) The transformers may be of either the constant-potential or constant-current type; but for the present purpose I find it most desirable to construct them to produce constant secondary current, this construction being one in which the primary and secondary coils are movable relatively to each other in a manner well understood in the art. The drawings indicate merely the primary and secondary windings and are not intended to show the particular structure whereby a constant secondary current may be produced, since the means for securing this result is well understood. The free terminals of the secondary winding are led forward and connected to brushes bearing upon collector-rings 5 6 7, forming part of the rectifying apparatus. These rings are electrically connected with appropriate segments in a rectifying-commutator K of suitable form. The rectified current from this commutator is led to translating devices, here shown as of the constant-current type, such as arc-lamps or the like. The collector-rings and the commutator thus referred to are of any ordinary type, and thus require no further description. The means whereby the commutator is driven includes, however, some novel features.

The power for driving the commutator is obtained from a synchronous motor, (indicated at S.) The field of this motor may be excited from any suitable source of direct current—such, for example, as a storage battery B. The armature of the motor is wound to receive two-phase currents and is supplied with four collector-rings 8, 9, 10, and 11 for leading the two-phase current into the armature. One phase, represented by the connections leading to the rings 8 9, receives current directly from the source of three-phase currents through leads 12 13, connected, respectively, to the mains 4 3, while the other phase, represented by the armature connections to the collector-rings 10 11, receives current from the secondary system of the transformers T T' T². This connection with the secondaries of the transformers may be made in any suitable manner; but for the present purpose I find it desirable to supply current to the collector-rings 10 and 11 by means of conductors leading from the free ends of the secondaries 14 and 15, as shown. As thus connected it will be noted that the current supplied over the leads 12 and 13 to one phase of the armature-winding of the motor has, generally speaking, a fixed phase relation with respect to the impressed electromotive forces of the supply-mains, while the current fed into the collector-rings 10 and 11, corresponding to the other phase of the motor-armature, has a phase relation with respect to the electromotive force impressed on the mains 12 and 13, which varies with the load on the secondaries of the transformer system, since, as is well known, the current in the secondaries of a transformer changes its phase relation with respect to the primary electromotive force as the load changes. Thus current of a given phase supplied over mains 12 and 13 to one phase of the motor and current of a relatively-shifting phase supplied to the other phase of the motor produce a resultant polar line which shifts in position with respect to the motor-armature as the load on the transformer system varies. This feature I take advantage of in adjusting the commutation of the rectifying device driven by the motor. As the load on the rectified circuit, and consequently in the secondary windings of the transformer system, varies the magnitude and phase of the current supplied from the secondary system to the motor correspondingly shift, thus shifting the polar line in the motor-armature, and, as a consequence, correspondingly shifting the motor-armature to bring the polar line into proper position with respect to the exciting-field. By making suitable adjustments and proportions of these various factors the motor-armature may be caused to move backward or forward, as the load on the rectified circuit changes, by such an amount as may be necessary to adjust the point of commutation of the rectifier, and thus secure minimum sparking.

I have described the transformers T, T', and T² as of the constant-current type, in which the secondary electromotive force consequently varies from zero to a maximum, thus correspondingly varying the current supplied to one phase of the driving-motor for the rectifier; but it is to be understood that transformers of the constant-potential type may be employed by making suitable connections. In this latter case one of the armature-windings of the driving-motor would be placed in series with one of the secondary mains in order to respond to change of load, since with a constant-potential system the secondary voltage varies but little.

A feature of my invention to which I have not heretofore alluded is the flexible connection between the driving-motor S and the rectifier K. This connection consists of a helical spring 16, connecting the shaft of the motor S with the shaft of the rectifier K, the latter being provided with a fly-wheel 17 in order to secure sufficient inertia. The spring 16 has for its object to overcome the detrimental effects due to variations in speed of synchronous motors, known in the art as "hunting." When operating in this manner, the speed of the motor surges backward and forward from the normal with a period of oscillation and a violence which depend upon many factors—such, for example, as the field strength of the motor, the reactance of the transmission-lines, and the steadiness or unsteadiness of the frequency of the supplied current. If the spring 16 be so chosen as to have a period of oscillation different from that of the period of oscillation of the motor, then these two periods will so far fail to combine as to produce a fairly uniform degree of rotation of the apparatus driven through the medium of the spring. The function of the fly-wheel 17 is to store up and restore energy due to flexure of the spring 16, and this fly-wheel or its equivalent is necessary or at least useful in obtaining the best results from the operation of the flexible connection 16.

Another form which my invention may assume is shown in Fig. 2, in which, as before, 1 indicates a source of three-phase alternating currents having transmission-lines 2, 3, and 4 leading therefrom. The current to be rectified is passed over leads 18, 19, and 20 to suitable collector-rings connected in the ordinary manner to a rectifying-commutator K'. Brushes bear upon the commutator K' and are adjusted in a certain fixed position thereon, the rectified current being conducted away through conductors 21 and 22, and after passing through a regulating-coil 23 going to translating devices not herein shown. The commutator K' is driven by a synchronous motor S', herein shown as of the two-phase type, one phase being supplied from the secondary 24 of a transformer whose primary 25 is connected to the supply-mains 2 4, while the other phase is supplied from the secondary 26 of a transformer whose primary 27 is connected across a different pair of mains 3 4 of the three-phase supply system. The necessary adjustment of the position of the motor-armature is secured by shifting the polar line of the rotating field, and this result is accomplished by varying the value of one phase of the supply-current with respect to the other. Although this does not necessarily change the phase of the respective currents, it does shift the position of the resultant field. I accomplish this change in relative magnitude of the currents supplied to the motor by inversely-varying resistances placed in series with the secondaries 24 and 26, these resistances being shown, respectively, at 28 and 29. Taps are brought out from each resistance and connected to suitable contact-points arranged on arcs of circles, and these contact-points coöperate with corresponding insulated switch-arms 30 and 31, connected to the terminals of the transformers 24 and 26, the circuits to the armature of the motor S' being completed by conductors 32 and 33, leading from the ends of the resistances 28 and 29, respectively. The switch-arm 34 is caused to oscillate backward and forward over its coöperating contacts by means of a link-and-lever connection with a core of magnetic material in inductive relation to the solenoid 23. A spring 35 acts upon the lever 36 and serves to urge the switch-arm 34 into one extreme position, while current flowing to the solenoid 23 by operating upon its core causes the switch-arm to be moved in the opposite direction. As the load in the circuit 21 22 varies it will thus be seen that the resistances in the respective supply-circuits for the two phases of the motor are inversely varied, thereby causing the polar line of the resultant field to shift correspondingly with respect to the armature. By suitably proportioning this effect the resultant shifting of the motor-armature may be made such as to shift the rectifying-commutator backward or forward with varying load by an amount required to adjust the point of commutation, and so secure a minimum amount of sparking.

In Fig. 2, as in Fig. 1, the synchronous motor shown may be excited by any suitable source of direct current—such, for example, as a storage battery B.

Instead of the resistances 28 29 any other suitable impedance may evidently be employed.

What I claim as new, and desire to secure by Letters Patent of the United States, is—

1. The combination of a rectifying-commutator, a motor for driving the same and a resilient connection between the commutator and the motor.

2. The combination of a rectifying-commutator, a motor for driving the same and a coiled-spring connection between the commutator and the motor.

3. The combination of a rectifying-commutator, a multiphase motor for driving the same, and automatically-controlled means for adjusting the position of the motor-armature with respect to the wave of current supplied to said commutator.

4. The combination of a source of alternating current, a rectifying-commutator, a multiphase motor supplied with current from said source and driving said commutator, and means for changing the relative magnitudes of currents supplied to said motor.

5. The combination of a source of alternating current, a rectifying-commutator, a multiphase motor supplied with current from said source and driving said commutator, and means for automatically changing the relative magnitudes of currents supplied to said motor in accordance with variations in magnitude of the rectified current.

6. The combination of a transformer, a rectifying-commutator connected to the secondary of the transformer, a multiphase motor for driving said commutator, connections between the primary supply-circuit for said transformer and conductors corresponding to one phase of the supply-circuit for said motor and other connections between conductors corresponding to another phase of the motor supply-circuit and the secondary circuit of said transformer.

7. The combination of a rectifying-commutator, a synchronous motor for driving the commutator, and means responsive to changes in the load supplied by said commutator for causing the armature of the motor to change its angular position with respect to some given point in the wave of impressed electromotive force.

8. The combination of a rectifying-commutator, a synchronous motor with its armature connected to said commutator, and automatically-controlled means for adjusting the angular position of the armature of the motor.

9. The combination of a source of alternating current, a rectifying-commutator, a motor supplied with current from said source and driving said rectifying-commutator, and means controlled by the rectified current for causing the shaft carrying the rectifying-commutator to change its angular position with respect to some given point in the wave of impressed electromotive force.

10. The combination of a source of alternating current, a rectifying-commutator, a motor for driving said commutator, and means for adjusting the angular position of the motor-armature with respect to the phase relation thereto of the impressed electromotive force.

In witness whereof I have hereunto set my hand this 6th day of January, 1900.

ELIHU THOMSON.

Witnesses:
 DUGALD MCKILLOP,
 JOHN MCMANUS.